UNITED STATES PATENT OFFICE.

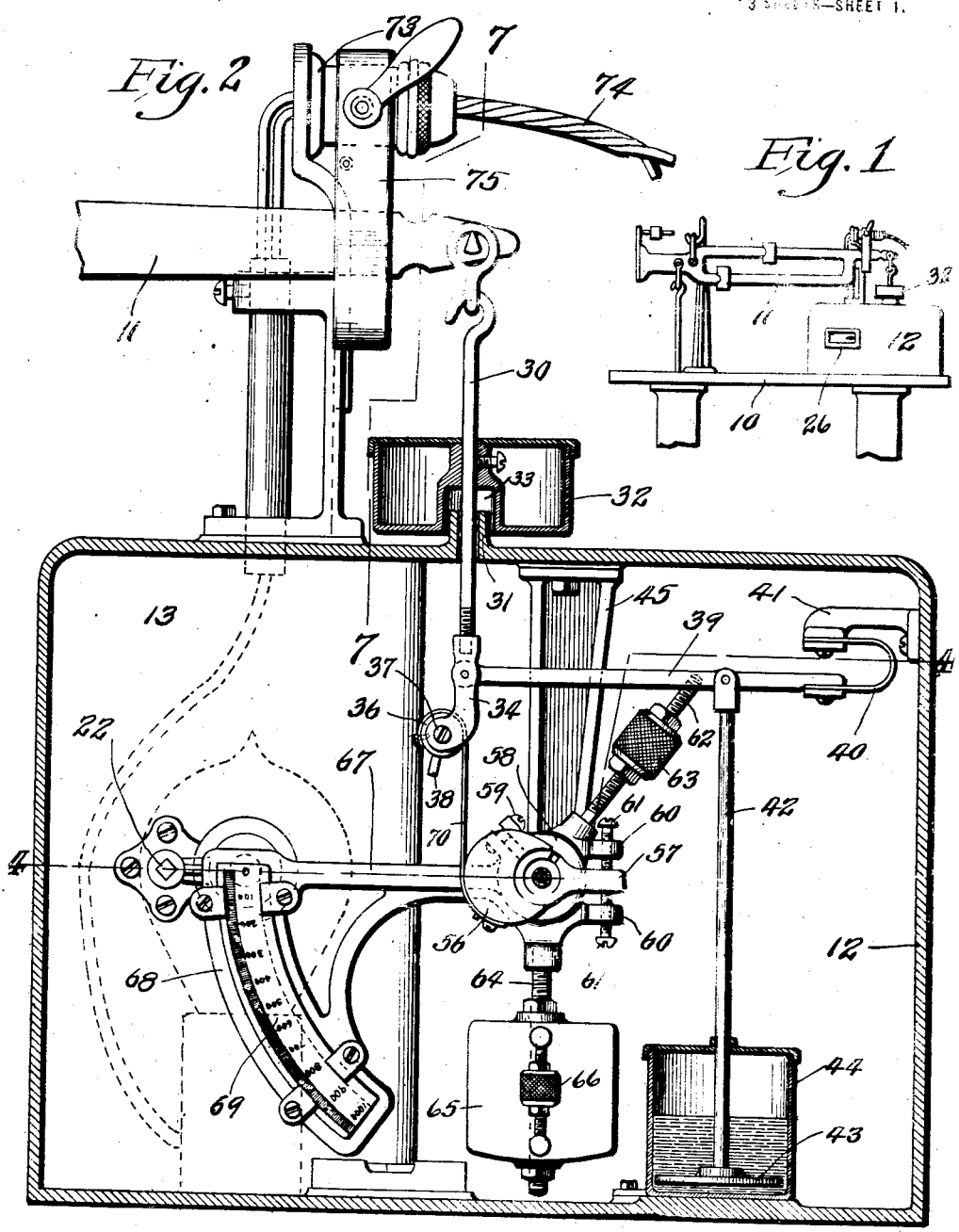

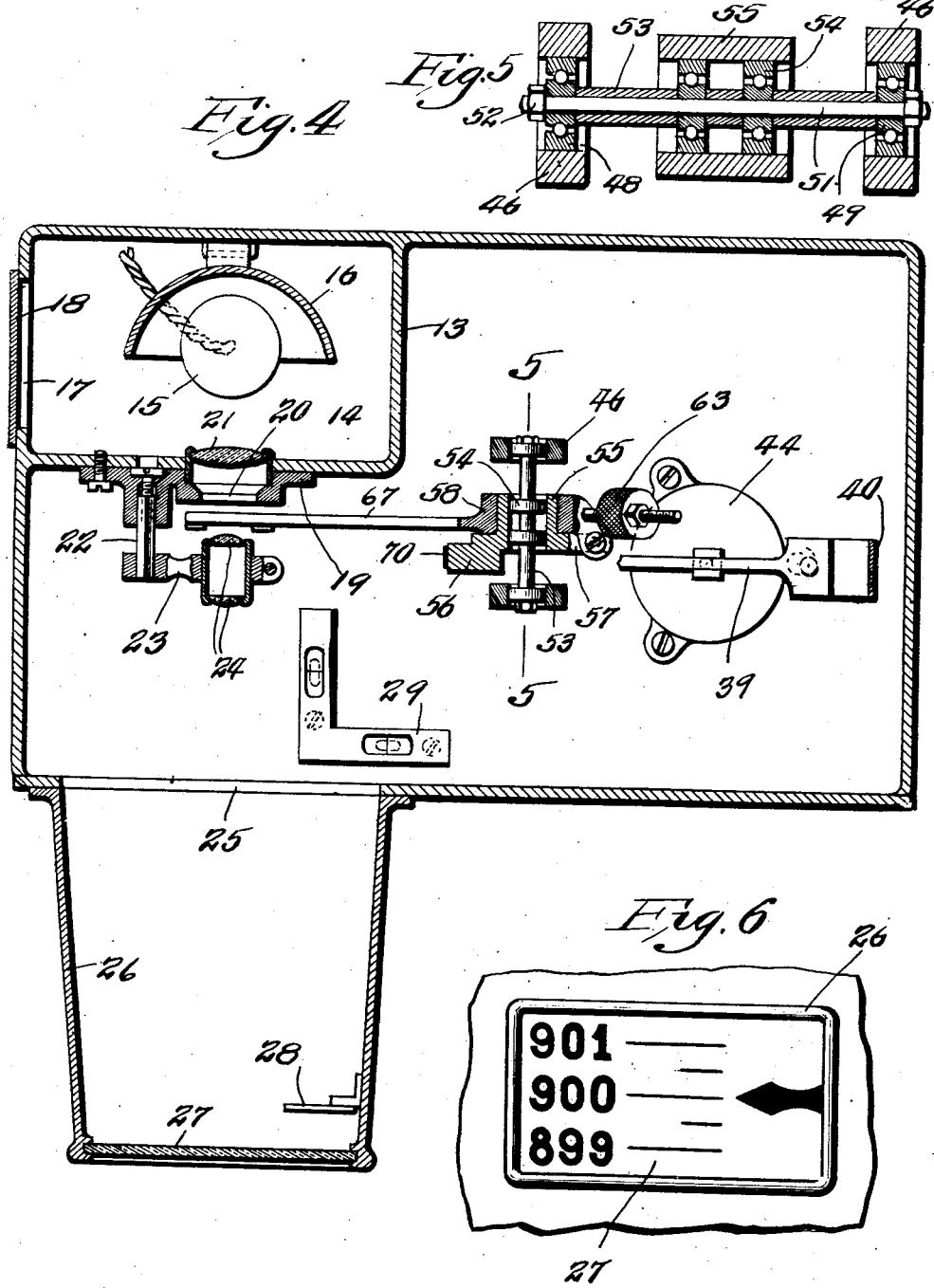

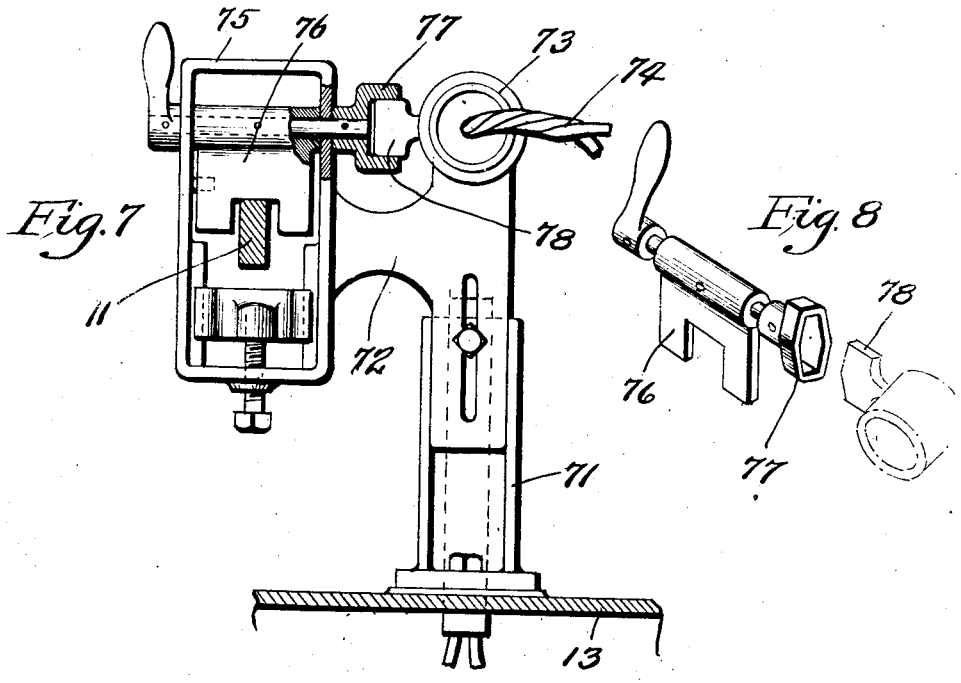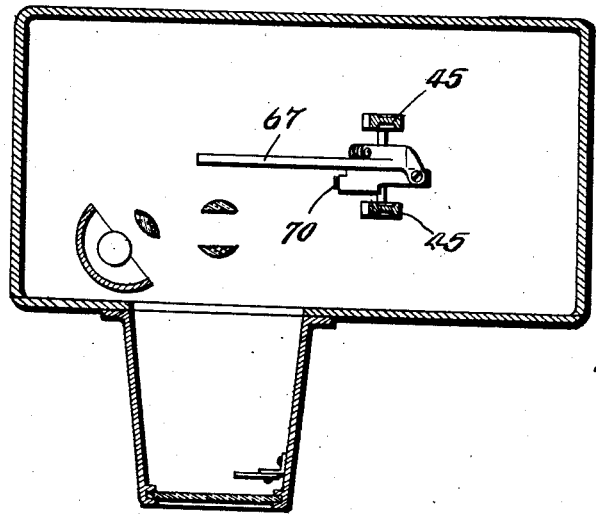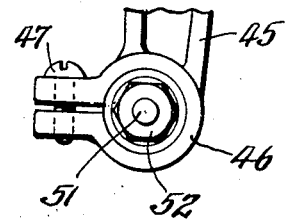

HENRY C. SCHAPER, OF ST. LOUIS, MISSOURI, ASSIGNOR TO THE GENERAL AUTOMATIC SCALE COMPANY, OF ST. LOUIS, MISSOURI, A CORPORATION OF MISSOURI.

WEIGHT INDICATOR FOR SCALES.

1,402,970.  Specification of Letters Patent.  Patented Jan. 10, 1922.

Application filed December 18, 1917. Serial No. 207,683.

*To all whom it may concern:*

Be it known that I, HENRY C. SCHAPER, a citizen of the United States, residing at St. Louis, Missouri, have invented a certain new and useful Improvement in Weight Indicators for Scales; of which the following is a full, clear, and exact description, such as will enable others skilled in the art to which it appertains to make and use the same, reference being had to the accompanying drawings, forming part of this specification.

My invention relates generally to scales or weighing machines, and more particularly to an automatically operating weight indicating mechanism which is directly connected to and operated by the scale beam or lever, the principal object of my invention being to provide a comparatively simple mechanism including a projecting apparatus for displaying on a ground glass or screen, enlarged weight indicating numerals, thereby making it possible for the weighman to easily and quickly read the weight of the loads placed on the scales or weighing machine, said apparatus being very compact and adaptable for use in connection with practically all types of beam scales.

Practically all the automatic indicators for scales now in general use include a dial and a finger or pointer operating thereover, and owing to the large number of graduated scale marks necessarily required, this dial is comparatively large in size. Further, the finger or pointer occupies a position a slight distance in front of the face of the dial and unless the eye of the weighman or operator is in direct alignment with the end of the pointer and the mark on the scale, accuracy in reading the exact weight indicated on the graduated scale cannot be obtained.

In automatic scales utilizing a comparatively large dial and pointer operating thereover, said pointer is usually secured to a comparatively small pinion which is journaled in separate bearings, said pinion being independent of the other parts of the weighing mechanism and being in mesh with a rack. In this form of mechanism it is necessary to maintain the lever system of the scale in a nearly level or horizontal position at all times to secure accuracy, and thus it will be seen that the rack which meshes with the pinion has a comparatvely small amount of motion and which motion is transmitted to the pointer through the pinion. Necessarily, the outer end of the pointer travels adjacent to the outer edge of the dial and thus it will be seen that any lost motion or wear between the rack and pinion will be greatly magnified or increased at the outer end of the pointer.

One of the principal objects of my invention is to eliminate all gearing and racks and pinions in the scale indicator, and to use lenses for magnifying the motion of the scale mechanism and insuring accuracy of weight indications.

To insure accuracy in results, I propose to utilize in a weight indicator a comparatively small transparent member, the same bearing a graduated scale, and further, to provide projecting means including a source of light and a series of lenses by means of which the graduated marks and numerals are magnified in size and projected onto a screen or ground glass so that, in enlarged form, they may be instantly and readily observed by the weighman or person in charge of the scales.

Further objects of my invention are, to reduce to a minimum the friction of the operating parts of the indicating mechanism; to provide for the facile adjustment of various parts of the operating mechanism; to provide a flexible fulcrum for one of the parts of the indicating mechanism, and which fulcrum also performs the functions of a shock absorber to prevent the transmission of undue strains to certain parts of the mechanism; and, further, to provide a weight indicator which is readily responsive and which is accurate and effective in performing its intended functions.

The subject-matter herein disclosed is an improvement on the weight indicator disclosed in my copending application filed November 4, 1916, Serial No. 129,604.

With the foregoing and other objects in view, my invention consists in certain novel features of construction and arrangement of parts, hereinafter more fully described and claimed, and illustrated in the accompanying drawings, in which—

Figure 1 is a front elevational view of the upper portion of a beam scale and showing my improved weight indicating mechanism associated therewith.

Figure 2 is a vertical section taken through the housing which contains the greater portion of the operating parts of my improved indicating mechanism.

Figure 3 is a detail section of an adjustable member forming a part of the device.

Figure 4 is a horizontal section taken approximately on the line 4—4 of Figure 2.

Figure 5 is an enlarged detail section taken approximately on the line 5—5 of Figure 4.

Figure 6 is an elevational view of the screen or ground glass onto which the magnified marks of the scale are thrown by the projecting apparatus.

Figure 7 is a vertical section taken approximately on the line 7—7 of Figure 2.

Figure 8 is a perspective view of a portion of the device utilized for locking the scale beam and manipulating the button of an electric switch.

Figure 9 is a horizontal section similar to Figure 5 and showing a modified arrangement of the projecting apparatus.

Figure 10 is a detail elevational view of a shaft bearing forming a part of my improved weight indicator.

In the drawings which illustrate a practical embodiment of my invention, 10 designates the table of an ordinary beam scale, 11 the beam or lever thereof, and positioned on said table and preferably at a point below the free end of the beam or lever is a housing 12 which is made as nearly dust-proof as possible, said housing containing the operating parts of my improved indicating mechanism.

A vertically disposed partition 13 is arranged in the rear left hand corner of the housing, said partition providing a chamber 14 in which is located a source of light 15, preferably an electric lamp, the same being disposed immediately in front of a reflector 16. An opening 17 is formed in the end wall of the housing 12 to provide access to the interior of the chamber 14, and this opening is normally closed by a plate 18.

Positioned on the front wall of partition 13 is a plate 19 in which is formed an opening 20, and suitably supported in said opening and disposed directly in front of the lamp 15 is a double convex condensing lens 21. Adjustably supported on the plate 19 to one side of the opening 20 is a forwardly projecting rod 22, the same carrying on its forward end a bracket 23. Adjustably positioned in this bracket and disposed directly in front of lens 21 is a pair of associated convex projecting lenses 24.

Formed in the front wall of the housing 12 and in front of the lenses 21 and 24 is an opening 25, and applied to said front wall around said opening is an outwardly projecting housing 26. Positioned in the outer end of this housing is a screen 27, the same being formed of a section of translucent material, preferably ground glass.

Inside the housing 27 and preferably on the right hand wall thereof a short distance away from the screen 27 is a finger or pointer 28 which, when the device is in operation, casts a heavy shadow on the inner face of the screen 27 to form a point or guide in reading the weight indicating numerals. (See Fig. 6.)

Located in the bottom of housing 12 is an L-shaped housing 29 and arranged in the legs thereof are spirit levels which serve as guides for setting the housing and the parts contained therein in a level position.

Pivotally connected to and depending from the free end of the scale beam or lever 11 is a rod 30, the same extending downwardly through an aperture which is formed on the top wall of housing 12 and around which is formed an upwardly projecting collar 31. Adjustably positioned on rod 30 is a hollow counterpoise 32 which is provided in its underside with a recess 33 which receives the collar 31. This counter-poise is hollow and its top plate or a portion thereof is removable in order to permit suitable counter weights to be placed in the hollow body. The position of the counterpoise on the rod 30 and the collar 31 extending upwardly into recess 33 provides a substantially dust-proof joint between rod 30 and bearing 31. In this connection it will be understood that it is particularly desirable that the interior of housing 12 be kept as free from dust as possible to insure successful operation and accurate results.

Positioned on the lower end of rod 30 is a bracket 34, the lower end of which is bifurcated to form legs 35 and arranged between said legs is a disc 36. A screw 37 passes through one of the legs 35 and the disc 36, and the threaded end of said screw is seated in the opposite leg 35. When this screw is tightened, the legs 35 are drawn toward each other to firmly grip and hold the disc 36.

Projecting from the periphery of disc 36 is a pin 38 by means of which the position of said disc may be adjusted. Pivotally connected to bracket 34 is one end of a horizontally disposed lever 39, the other end of which is connected by a flexible fulcrum 40 to a bracket 41, the latter being secured to one of the walls of housing 12. This flexible fulcrum comprises a relatively thin section of resilient metal, preferably steel, the same being bent into substantially U-shape and arranged with its legs in horizontal alignment, one leg being connected to lever 39 and the other to bracket 41.

Pivotally connected to and depending from lever 39 is a rod 42, the lower end of which carries a disc 43, and said disc being positioned in a dash pot 44, which contains oil, glycerine or a similar heavy liquid. Secured to the top plate of housing 12 at a point between bearing 31 and bracket 41 is the upper end of a bracket which includes a pair of parallel legs 45, the lower ends thereof being formed into split bearings 46. The ends of each of these bearings receive a screw 47 which, when tightened, contracts the bearing so as to firmly grip the outer housing or race of an anti-friction bearing, preferably of the ball type. (See Figs. 5 and 10.)

Each of these bearings includes an outer race 48, an inner race 49, and a series of balls 50 arranged between the races, said balls being held in a suitable cage or spacing ring. The inner races 49 and the two bearings are maintained on the end portions of a shaft 51 and screw-seated on the threaded ends of this shaft are nuts 52, the same bearing directly against said inner race. Arranged on shaft 51 between these anti-friction bearings and spaced apart therefrom and from each other by means of sleeves 53, which are located on said shaft, are anti-friction bearings 54, the same including inner and outer races between which are interposed balls. The outer races of the anti-friction bearings 54 are gripped by a split tubular member or sleeve 55 with one end of which is formed integral an eccentrically disposed disc 56 and a radially disposed outwardly projecting finger 57.

Enclosing the sleeve 55 is a split ring or collar 58 in the ends of which is seated a screw 59 which, when tightened, contracts said collar, thereby simultaneously gripping and contracting sleeve 55 and which latter grips the outer races of the anti-friction bearings 54.

Formed integral with collar 58 and suitably spaced apart is a pair of laterally projecting lugs 60 in which are seated set screws 61, the points thereof engaging the upper and lower faces of finger 57.

By adjusting the positions of the screws 61 in the lugs 60, the relative position of the sleeve 55 within collar 58 is changed and adjusted.

Seated in and projecting upwardly at an angle from collar 58 is a threaded rod 62 on which is adjustably positioned a counter-balancing weight 63. Depending from the collar 58 is a threaded rod 64 on which is adjustably positioned a counter-balancing weight 65, and arranged for vertical adjustment on the latter is a relatively small weight 66.

Formed integral with or fixed to collar 58 on the opposite side from the fingers 60 is an arm 67 which normally occupies a horizontal position, and formed integral with or fixed to the outer portion of this arm is a depending frame 68 of segmental form, the upper portion of which normally occupies a position directly between the lenses 21 and 24.

Positioned in this frame is a section 69 of glass, celluloid or other transparent material, the same being provided on one of its faces with an arcuate scale, the graduated marks and numerals of which are comparatively small. This arcuate scale is concentric with the axis of shaft 51.

Secured in any suitable manner to the disc 36 is the upper end of a thin flexible band or tape of metal 70, the lower end thereof being fixed in any suitable manner to the lower portion or underside of eccentric 56. Positioned on top of the housing 12 is a post 71 and adjustably positioned thereupon is a bracket 72, the same carrying a switch 73 in the line 74 which leads to the lamp 15.

Formed on or fixed to the bracket 72 is a substantially rectangular loop 75 which encloses the beam 11 and hinged in the upper portion of said loop is a plate 76 which, when moved into a substantially vertical position, bears on top of beam or lever 11 and holds the same against upward movement. Secured to this locking plate 76 is a socket 77 which is adapted to receive the button 78 which is associated with the switch 73.

The subject-matter just described, that is, the combination beam lock and switch turning device, is not claimed in this application, but is disclosed and claimed in a copending application.

The operation is as follows:

Under normal conditions or while the parts of my improved indicating mechanism are at rest, said parts occupy the positions illustrated in Figure 2, with the zero mark of the graduated scale on transparent member 69 in direct alignment with the centers of the lenses 21 and 24, and when lamp 15 is lighted, the rays of light therefrom will be directed forwardly through condensing lens 21, thence through transparent member 69, and thence through lenses 24, and as a result, zero mark on the graduated scale will be magnified and in such condition thrown onto screen 27.

The pointer or finger 28 being directly in the path of travel of the light rays onto the screen, will cast a shadow on said screen, thereby forming a definite guide for the reading of that portion of the scale which is thrown onto the screen.

One of the important features of my invention is the throwing of the screen and the shadow of the pointer 28 onto the flat surface of the screen or ground glass 27, for by such action and result, the numbers and marks of said graduated scale can easily be read from any angle in front of the screen. This is a result which cannot be accomplished with a scale indicator wherein a pointer or finger moves over the face of a dial, for where such construction is employed and accuracy is essential, it is necessary for the weighman to be positioned directly in front of the dial or in a position so that the eye is directly in alignment with the pointer and the numeral or scale mark where said pointer stops.

Loads placed on the scale platform will move the outer end of beam or lever upward and following this action, rod 30 will be drawn upward, consequently moving tape 70 in a like direction and pulling upward on eccentric disc 56, with the result that sleeve 55, collar 58 and parts carried thereby, will be partially rotated. During this action, the anti-friction bearings 54 which support sleeve 55 are in action, and if there is any tendency of the shaft 51 to rotate, the outer pair of bearings comprising the parts 48, 49 and 50 will be thrown into action, and as a result, the friction of the operating parts is reduced to a minimum. In this connection it will be understood that the outer pair of bearings or those supported in the lower ends of legs 45, serve as a support for the shaft 51, and the latter through bearings 54 serves as a support for sleeve 55 and the parts carried thereby. Rod 64 and weight 65 constitute a pendulum which is thrown into action whenever sleeve 55 is partially rotated, as just described, and as this pendulum is swung laterally and upwardly, arm 67 and transparent member 69 will be moved upward and when such movement ceases, the mark on the graduated scale which is directly in alignment with the centers of the lenses 21 and 24 will be projected in enlarged form onto the screen 27, this indicating to the weighman or person in charge of the scale, the weight of the load placed on the scale platform.

As soon as the load is removed from the platform, the various parts of the indicating mechanism which have been in action will return to their normal positions.

During operation, the pendulum weight 65 and the counter-balancing weight 63 tend to cause the various parts of the operating mechanism to act with regular and steady movements and this tendency is accentuated by the dash pot comprising the parts 43 and 44, which latter is effective in eliminating all vibration that may arise during the movements of the parts of the mechanism.

The member 40, in addition to serving as a flexible fulcrum for lever 39, performs the functions of a shock absorber to assist the dash pot in eliminating vibration. During the operation of my improved weight indicating mechanism, eccentric disc 56 performs the functions of a lever in converting the upward movement of flexible member 70 into rotary movement and transmitting the same to sleeve 55 and by utilizing an eccentric disc and securing tape 70 to the lower portion of said disc, the leverage between member 70 and the axis of movement gradually and proportionately decreases as the pendulum weight 65 swings upward or toward the horizontal plane occupied by the axis.

Weight 63 which is adjustable upon rod 62 serves as a counter-balance for arm 67, frame 68, and transparent member 69, and by adjusting the position of said weight 63, the angularity of arm 67 with respect to a true horizontal plane can be very accurately regulated. The position of eccentric 56 with respect to the horizontal plane occupied by arm 67 can be very accurately regulated by proper manipulation of screws 61, it being understood that when this lateral adjustment is accomplished, screw 59 must be loosened to permit the movement of sleeve 55 within collar 58. When screw 37 is loosened, disc 36 can be rotated in one direction or the other to lengthen or shorten flexible member 70.

To adjust the lenses 24 so as to properly focus the same with respect to lens 21, rod 22 can be moved forward or backward in its bearing upon plate 19.

One of the important features of my invention is the projecting of the indicating marks of the graduated scale directly onto the flat inner surface of the screen member 27, and at the same time the light rays projected onto said screen will cause pointer member 28 to cast a shadow on the inner surface of the screen. The graduated marks and the shadow of the pointer appear on a flat surface and the weighman or person operating the scale can readily read the indicated weight from any point in front of the screen.

In Figure 9 I have illustrated a modification of the indicating mechanism, and in this form of device, the plate or member bearing the arcuate scale is opaque and said scale is formed on a reflecting surface. The lamp and condensing lens instead of being located to the rear of the scale bearing member are arranged in front of and at an angle to the reflecting surface so that the rays of light after passing through the condensing lens strike against the reflecting surface on which the graduated marks and numbers of the scale appear and the reflected rays of light are thrown outward through the projecting lenses and by the latter said light rays are thrown forward onto the screen or ground glass.

A weight indicator of my improved construction is comparatively simple, is very compact, can be readily utilized with practically all types of beam scales, is sensitive and accurate in operation, and instantly displays in comparatively large form the number corresponding to the weight of the load placed on the scale platform.

In the event that any part of my improved weight indicating mechanism becomes inoperative, the weighing scale and its beam may be operated in the usual manner by placing the regular counter-balancing weights on top of the housing 32 which is carried by rod 31.

It will be readily understood that minor changes in the size, form and construction of the various parts of my improved weight indicator can be made and substituted for those herein shown and described, without departing from the spirit of my invention, the scope of which is set forth in the appended claims.

I claim:

1. The combination with a movable part of a scale, of a pendulum carrying a transparent member provided with a graduated scale, a connection between said movable scale part and said pendulum, a portion of which connection is flexible, and means for adjusting the length of said connection.

2. The combination with a movable part of a scale, of a pendulum, a flexible connection from said movable scale part to said pendulum, a transparent member carried by said pendulum, said transparent member being provided with a graduated scale, a screen, means for projecting the marks of said graduated scale onto said screen, and a pointer arranged between the screen and the transparent member.

3. The combination with a part of a scale movable in accordance with the weight on the scale, of a housing, a bracket within said housing and suspended from the movable part of said scale, an arm mounted for oscillatory movement in said housing, an adjustable connection between said arm and said bracket, a transparent member carried by the free end of said arm and provided with weight indicia, a screen carried by said housing, and means for projecting the weight indicia in enlarged form onto said screen.

4. The combination with a beam of a scale, of a housing, a rod suspended from said beam, a bracket carried by the lower end of said rod, an arm mounted for oscillatory movement in said housing, an adjustable connection between said bracket and said arm, a transparent member carried by the free end of said arm and provided with weight indicia, a screen carried by said housing, and means for projecting the weight indicia in enlarged form onto said screen.

5. The combination with a weighing scale having a beam, of a pivotally supported pendulum, a flexible connection between said pendulum and the scale beam, a rod pivotally connected to a part of said flexible connection, said rod having a flexible fulcrum, a vibration arrestor associated with said rod, a transparent member carried by the pendulum, said transparent member being provided with a graduated scale, a screen and means for projecting the marks of said graduated scale onto said screen in enlarged form.

6. In a weight indicator for scales, a shaft journaled in anti-friction bearings, anti-friction bearings on said shaft, a member supported by said last mentioned anti-friction bearings, a pendulum weight carried by said member, an arm carried by said member, a transparent member carried by arm, which transparent member is provided with a graduated scale, a screen and means for projecting the marks of the graduated scale onto said screen in enlarged form.

7. In a weight indicator for scales, a shaft journaled in anti-friction bearings, anti-friction bearings arranged on said shaft, a sleeve supported by said anti-friction bearings, a collar adjustably positioned on said sleeve, a pendulum weight suspended from said collar, an arm carried by said collar, a transparent member carried by said arm, which transparent member is provided with a graduated scale, a screen and means for projecting the marks of said scale onto said screen in enlarged form.

8. The combination with a beam of a scale, of a housing, a rod suspended from said beam, a bracket carried by the lower end of said rod, an adjustable member carried by said bracket, an arm mounted for oscillatory movement in said housing, a flexible connection between said adjustable member and said arm, a transparent member fixed to the free end of said arm and provided with weight indicia, a screen carried by said housing, and means for projecting the weight indicia in enlarged form onto said screen.

9. The combination with a beam of a scale, of a housing, a rod suspended from said beam and extending downwardly into said housing, transparent member mounted for oscillatory movement in said housing and provided with weight indicia, adjustable connections between the lower end of said rod and said transparent member, a screen carried by said housing, a pointer located in said housing adjacent to said screen, and means for projecting said indicia in enlarged form onto said screen.

10. The combination with a beam of a scale, of a housing, a rod suspended from said beam and extending downwardly into said housing, a bracket carried by the lower end of said rod, an arm pivotally mounted in said housing, an adjustable member mounted in said bracket, a flexible connection between said adjustable member and said arm, a transparent member carried by the free end of said arm and provided with indicia, a screen carried by said housing, and means for projecting said indicia in enlarged from onto said screen.

11. In a weight indicator for scales, a pivotally supported pendulum weight which is adapted to be actuated by loads placed on the scale, a member provided with a graduated scale which is adapted to be moved by the load actuated member, a screen, means for projecting the marks of the graduated scale in enlarged form onto said screen, and a pointer arranged between the screen and the member provided with the graduated scale.

12. The combination with a movable part of a scale, of a transparent member which is actuated by said movable scale part, a screen, means for projecting the marks of said graduated scale onto said screen, and a pointer located in the path of travel of the light rays from the projecting means to said screen.

13. The combination with a movable part of a scale, of a transparent member which is actuated by said movable scale part, a screen, means for projecting the marks of said graduated scale onto said screen, and a pointer arranged to cast a shadow on the surface of the screen onto which the graduated marks are projected.

14. In a weight indicator for scales, a housing containing weight indicating means, a rod extending into the opening in the top of said housing and connected to a part of the indicating means and to the beam of the scale with which the indicator is associated, a collar projecting upwardly from the housing around said opening, and a counter-poise positioned on said rod above the housing, said counter-poise being provided with a recess in its underside for the accommodation of the collar on the housing.

15. The combination with a beam of a scale, of a housing, a rod suspended from said beam and extending downwardly into said housing, an adjustable member carried by the lower end of said rod, a sleeve journaled in said housing, an oscillatory arm fixed to said sleeve, an operative connection between said sleeve and said adjustable member, a transparent member fixed to the free end of said arm and provided with indicia, a screen carried by said housing, and means for projecting said indicia in enlarged form onto said screen.

16. The combination with a beam of a scale, of a housing, a rod suspended from said beam, an adjustable member carried by the lower end of said rod, a sleeve journaled in said housing, an oscillatory arm arranged on said sleeve, means for adjusting said arm on said sleeve concentrically with the axis of the oscillatory movement, an operative connection between said sleeve and said adjustable member, a transparent member fixed to the free end of said arm and provided with weight indicia, a screen carried by said housing, and means for projecting said weight indicia in enlarged form onto said screen.

17. In a weight indicator for scales, a transparent member connected to and adapted to be actuated by the beam of the scale with which the device is associated, said transparent member being provided with a graduated scale, a screen means for projecting the marks of said graduated scale onto said screen, a lever associated with the connection between the transparent member and the scale beam, said lever having a flexible fulcrum, and a dash pot directly connected to said lever.

18. In a weight indicator for scales, a shaft mounted in anti-friction bearings, a pendulum supported by anti-friction bearings on said shaft, a transparent member carried by said pendulum, said transparent member being provided with a graduated scale and means for adjusting the normal position of the pendulum with respect to its axis.

19. In a weight indicator for scales, a shaft mounted in anti-friction bearings, a pendulum supported by anti-friction bearings on said shaft, a transparent member carried by said pendulum, said transparent member being provided with a graduated scale, means for adjusting the normal position of said pendulum with respect to its axis, and flexible connections between said pendulum and a movable part of the scales with which the device is associated.

20. In a weight indicator for scales, a shaft mounted in anti-friction bearings, a pendulum supported by anti-friction bearings on said shaft, a transparent member carried by said pendulum, said transparent member being provided with a graduated scale, means for adjusting the normal position of said pendulum with respect to its axis, flexible connections between said pendulum and a movable part of the scales with which the device is associated, a screen, and means for projecting the marks of the graduated scale onto said screen.

21. In a weight indicator for scales, a housing, a screen forming a part of one of the walls thereof, a pivotally mounted weighted arm within said housing, which arm is adapted to be actuated by loads placed on the scale platform, a transparent member carried by said arm, said transparent member bearing a graduated scale, and means within the housing for projecting the marks of said graduated scale onto the screen.

22. In a weight indicator for scales, a housing, a screen forming a part of one of the walls of said housing, a pendulum mounted for operation within said housing and adapted to be actuated by loads placed on the scale platform, a transparent member carried by said pendulum, said transparent member being provided with weight indicating characters, and means for projecting the weight indicating characters onto said screen.

23. In a weight indicator for scales, a housing, a screen forming a part of one of the walls of said housing, a member mounted for operation within said housing and adapted to be moved in one direction by loads applied to the load receiving member of the scale, said member being mounted so as to return to its normal position by gravity, a transparent member carried by said movable member, said transparent member bearing weight indicating characters, and means for projecting said characters onto said screen.

24. The combination in a weighing scale having a beam, of a pivotally mounted pendulum weighted arm, means adapted to be actuated by the scale beam for swinging said arm upon its pivot, a transparent member carried by said arm and adapted to travel in the arc of a circle concentric with the pivot point of said arm, said transparent member being provided with a graduated scale, a screen, and means for projecting the marks of the graduated scale in enlarged form onto said screen.

25. The combination in a weighing scale having a beam, of a pivotally mounted pendulum weighted arm, means adapted to be actuated by the scale beam for swinging said arm upon its pivot, a transparent member carried by said arm and adapted to travel in the arc of a circle concentric with the pivot point of said arm, said transparent member being provided with a graduated scale, a screen, means for projecting the marks of the graduated scale in enlarged form onto said screen, and means for arresting the vibration of the pendulum weighted arm.

26. The combination with the movable part of a weighing scale, of a substantially transparent member that is adapted to be moved in one direction by the movement of said movable part and in the opposite direction by gravity, said transparent member bearing a graduated scale, a housing for said transparent member, a screen on said housing, and means for projecting the marks of the graduated scale in enlarged form onto said screen.

27. The combination with a movable part of a weighing scale, of a transparent member provided with a graduated scale, means operated by the scale part for moving the transparent member in one direction in direct ratio to the movement of said scale part, said last mentioned means being movable in the other direction by gravity, a housing for said transparent member and the operating means therefor, a screen on said housing, and means for projecting the marks of the graduated scale onto said screen.

28. The combination with a weighing scale having a part which is adapted to be actuated by loads placed on the scale, a member provided with a graduated scale, which member is adapted to be moved in one direction by the load actuated member of the weighing scale and to be moved in the opposite direction by gravity, a housing enclosing the graduated scale bearing member, a screen on said housing, and means for projecting the marks of said graduated scale onto said screen.

29. In a weight indicator for scales, the combination with a member associated with the scales and adapted to be moved in one direction by the loads placed thereon and to be moved in the opposite direction by gravity, said member being provided with weight indicating marks, a housing for said member, a screen on said housing, and means for projecting said marks onto said screen.

30. In a weight indicator for scales, the combination with a member associated with the scales and adapted to be moved in one direction by the loads placed thereon and to be moved in the opposite direction by gravity, said member being provided with weight indicating marks, a housing for said member, a screen on said housing, and means for projecting said marks in enlarged form onto said screen.

In testimony whereof I hereunto affix my signature this 13th day of December, 1917.

HENRY C. SCHAPER.